United States Patent
Altenschmidt

(10) Patent No.: US 7,314,036 B2
(45) Date of Patent: Jan. 1, 2008

(54) METHODS FOR OPERATING A SPARK-IGNITION INTERNAL COMBUSTION ENGINE

(75) Inventor: Frank Altenschmidt, Biberach (DE)

(73) Assignee: DaimlerChrysler AG, Stuttgart (DE)

( * ) Notice: Subject to any disclaimer, the term of this patent is extended or adjusted under 35 U.S.C. 154(b) by 44 days.

(21) Appl. No.: 10/527,457

(22) PCT Filed: Sep. 6, 2003

(86) PCT No.: PCT/EP03/09918

§ 371 (c)(1),
(2), (4) Date: Nov. 10, 2005

(87) PCT Pub. No.: WO2004/027237

PCT Pub. Date: Apr. 1, 2004

(65) Prior Publication Data

US 2006/0124104 A1 Jun. 15, 2006

(30) Foreign Application Priority Data

Sep. 12, 2002 (DE) ................................ 102 42 226

(51) Int. Cl.
*F02B 3/02* (2006.01)
(52) U.S. Cl. ....................................................... 123/299
(58) Field of Classification Search ......... 123/294–305
See application file for complete search history.

(56) References Cited

U.S. PATENT DOCUMENTS 5,794,585 A 8/1998 Yonezawa et al.

6,659,073 B1 * 12/2003 Franke et al. ................ 123/299
6,691,671 B2 * 2/2004 Duffy et al. .................. 123/299
6,698,396 B2 * 3/2004 Pfaeffle et al. ............... 123/299
7,204,228 B2 * 4/2007 Oechsle et al. .............. 123/299

FOREIGN PATENT DOCUMENTS

DE 198 57 785 C2 6/2000
DE 100 14 553 A1 10/2001

(Continued)

OTHER PUBLICATIONS

International Search Report dated Mar. 26, 2004.

*Primary Examiner*—Erick Solis
(74) *Attorney, Agent, or Firm*—Crowell & Moring LLP

(57) ABSTRACT

The invention relates to two methods for forming a fuel/air mixture of a directly injecting internal combustion engine with a spark ignition. In the first method, the fuel injection is configured in a homogeneous operating mode of the internal combustion engine in such a way that a first and a second part amount are introduced in the intake stroke, and a third part amount is introduced in the compression stroke, wherein the ignition of the fuel/air mixture which is formed takes place after the end of injection of the third part amount. In the second method, the fuel injection is configured in a stratified charge operating mode of the internal combustion engine in such a way that a first, a second and a third part amount are introduced into the combustion chamber during the compression stroke of the internal combustion engine, wherein the injection of the second part amount is ended at a crank angle which lies in a range between 15° CA before the ignition time to 4° CA after the ignition time.

8 Claims, 2 Drawing Sheets

FOREIGN PATENT DOCUMENTS

| | | |
|---|---|---|
| EP | 1 167 734 A2 | 1/2002 |
| JP | 62-168961 | 7/1987 |
| JP | 9-296747 | 11/1997 |
| JP | 11 082030 | 3/1999 |
| JP | 11-82224 | 3/1999 |
| JP | 2000-110568 | 4/2000 |
| JP | 2002-115593 | 4/2002 |

\* cited by examiner

METHODS FOR OPERATING A SPARK-IGNITION INTERNAL COMBUSTION ENGINE

This invention relates to a method for operating a spark-ignition internal combustion with direct injection.

When spark-ignition internal combustion engines with direct injection operate, a series of measures are performed to improve the formation of mixture so that reliable ignition is brought about in a stratified charge operating mode of the internal combustion engine. Attempts are often made to influence the mixture formation in a targeted fashion by clocking the fuel injection.

German Patent document DE 198 577 85 C2 discloses a method for mixture formation in a combustion chamber of an internal combustion engine in which a three-stage fuel injection is performed without interrupting the injection and in which a main amount of fuel is connected to an ignition amount of fuel via a supplementary amount of fuel.

Laid-open German Patent application document DE 100 14 533 A1 discloses a method for operating a spark-ignition internal combustion engine with direct injection, in which clocked injection of fuel is performed both in a homogeneous operating mode and in a stratified charge operating mode. In this context a fuel injector is repeatedly opened and closed with a predefined clock sequence during an injection time so that the entire fuel which is provided for mixture formation is introduced into the combustion chamber in a large number of short part injections.

In the known methods, an optimum combustion method is often not achieved in modern spark-ignition internal combustion engines with direct injection because it is not possible to ensure an operating behavior of the internal combustion engine without misfires.

The object of the invention is, in contrast with the above, to configure the injection process in such a way that an ignitable mixture cloud is formed in the vicinity of an ignition source in order to bring about an improved operating behavior without misfires.

This object is achieved according to the invention by way of methods as claimed.

The first method according to the invention is characterized in that the fuel injection is configured in a homogeneous operating mode of the internal combustion engine in such a way that first and second part amounts are introduced in the intake stroke, and a third part amount is introduced in the compression stroke, so that the ignition of the fuel/air mixture which is formed takes place after the end of injection of the third part amount. Alternatively, the second part amount can take place in a starting part of the compression stroke, in particular up to approximately 80° crank angle before a top dead center. The ignition of the fuel/air mixture which is formed is preferably configured in such a way that it takes place at a distance of at most 100° crank angle after the end of the injection of the third part amount. In this way an application of fuel to the wall in the combustion chamber, in particular to the cylinder wall, is avoided. The injection part amounts are controlled in such a way that the fuel jets which are injected come apart to a greater extent and vaporize more quickly since the total amount is introduced into the combustion chamber in a clocked fashion. As a result, the best possible homogenization of the mixture of the injected part amounts takes place, with a significant application of fuel to the cylinder wall being avoided at the same time.

In one refinement of the first method, the injection of fuel is configured in such a way that the injection period of the third part amount is varied as a function of the load so that it is approximately 5%-50% of the entire amount of fuel. This influences the properties of the mixture formation in such a way that the power-producing combustion takes place in an optimum way. This reduces the consumption and formation of emissions. Furthermore, the position of the mixture cloud which is formed at the respective load point is influenced in such a way that its location in the combustion chamber at the ignition time is configured in an optimum way in the vicinity of the ignition source.

According to the invention, the injection of the first part amount is started in the intake stroke of the internal combustion engine in a homogeneous operating mode between 300° crank angle and 200° crank angle before an ignition top dead center (ZOT).

In a further refinement of the first method, a period between the end of injection of the first part amount and the start of injection of the second part amount is between 10° crank angle and 100° crank angle.

According to a further refinement of the first method, the second part amount is varied as a function of the load so that, under certain circumstances, it may be less than one percent of the entire fuel injection amount.

Furthermore, the main amount of the injected fuel can be divided between the first and second injections. In this context, the amount of fuel of the third injection is defined by means of the injection time since that time is very short.

In a further refinement of the first method, the fuel injection in the homogeneous operating mode is configured in such a way that the first and second injections are defined by means of an absolute angle, and the third injection is defined by means of a difference angle with respect to the ignition time as a function of the load. In this context, in the case of active knocking control the third injection can also take place later in accordance with the ignition time.

The second method according to the invention is characterized in that, in a stratified charge operating mode of the internal combustion engine, the fuel injection is configured in such a way that first, second and third part amounts are introduced into the combustion chamber in a compression stroke of the internal combustion engine, with the injection of the second part amount ended at a crank angle which lies in a range between 15° crank angle before the ignition of the fuel/air mixture which is formed and 4° crank angle after the ignition of the fuel/air mixture which is formed. It is conceivable for the first part amount to be performed in the intake stroke preferably between 200° and 300° crank angle before a top dead center. The position and properties of the ignitable mixture cloud are influenced positively, as a result of which a stratified charge operating mode can be configured in an optimum way in all load ranges. The mixture cloud which is brought about in this way can be reliably ignited while retaining an optimized efficiency level. As a result, it is possible to minimize the undesired misfires further.

In one refinement of the second method, the period between the start of injection of the third part amount and the end of injection of the second part amount is approximately 0.15-0.4 msec. The second injection is defined here by the end of injection as a difference with respect to the ignition time so that the positions of the first and third injections are defined by a time interval from the start of injection or the end of injection of the second injection. The mass of fuel of the first and third injections is preferably defined by means of the injection time since these amounts of fuel are small. The amount of fuel of the main injection, i.e. of the second injection, results from the difference between the amounts of fuel of the first and third injections. In the case of high loads with an effective average pressure $P_{me}$ greater than 4 bar, it is possible for the mass of fuel of the first part amount to be up to approximately 50% of the entire mass of fuel.

In a further refinement of the invention, the two methods according to the invention are used with injection nozzles which open to the outside and in which the fuel is injected as a hollow cone. Such injection nozzles are preferably used in spark-ignition internal combustion engines in which combustion behavior which is guided by jet takes place. In such an engine, the fuel is injected in such a way that a toroidal eddy is formed at the end of the fuel hollow cone, wherein the electrodes of a spark plug which is arranged in the combustion chamber are arranged outside the injected fuel hollow cone but at the same time lie within a fuel/air mixture which is formed. It is conceivable for two spark plugs to be used for injecting the fuel/air mixture which is formed. By means of the two methods described, an ignitable mixture cloud is retained in approximately all of the rotational speed ranges and load ranges since misfires are prevented from occurring.

Further features and feature combinations emerge from the description. Specific exemplary embodiments of the invention are illustrated in a simplified form in the drawings and are explained in more detail in the following description.

DETAILED DESCRIPTION OF THE INVENTION

An exemplary spark-ignition internal combustion engine with direct fuel injection has at least one cylinder in which a combustion chamber is formed between a piston which is held in the cylinder in a longitudinally displaceable fashion and a cylinder head. The longitudinal movement of the piston extends between a top dead center OT and a bottom dead center UT. The internal combustion engine operates according to the 4-stroke principle, with the method according to the invention also being suitable for spark-ignition 2-stroke internal combustion engines with direct injection.

In the first stroke of the 4-stroke internal combustion engine, combustion air is fed to the combustion chamber through an inlet duct, with the piston moving in a downward movement as far as a gas-exchange bottom dead center GUT. In a further compression stroke, the piston moves in an upward movement from GUT as far as an ignition top dead center ZOT at which the fuel is injected in a stratified charge operating mode of the internal combustion engine during the compression stroke. In the vicinity of the top dead center ZOT, the fuel/air mixture is ignited by means of a spark plug, with the piston expanding in a downward movement as far as a bottom dead center UT. In the last stroke, the piston moves in an upward movement as far as the gas-exchange top dead center GOT and pushes the gases out of the combustion chamber.

The internal combustion engine according to the present exemplary embodiment is preferably operated in the stratified charge operating mode when there is a low load or medium-sized load L and/or at low to medium rotational speeds N, and in the homogeneous operating mode in the upper load range or at full load. Alternatively, the stratified charge operating mode can be expanded to other load ranges, for example to the upper load range or full load. The homogeneous operating mode can also be expanded to low load ranges.

Figure 1:
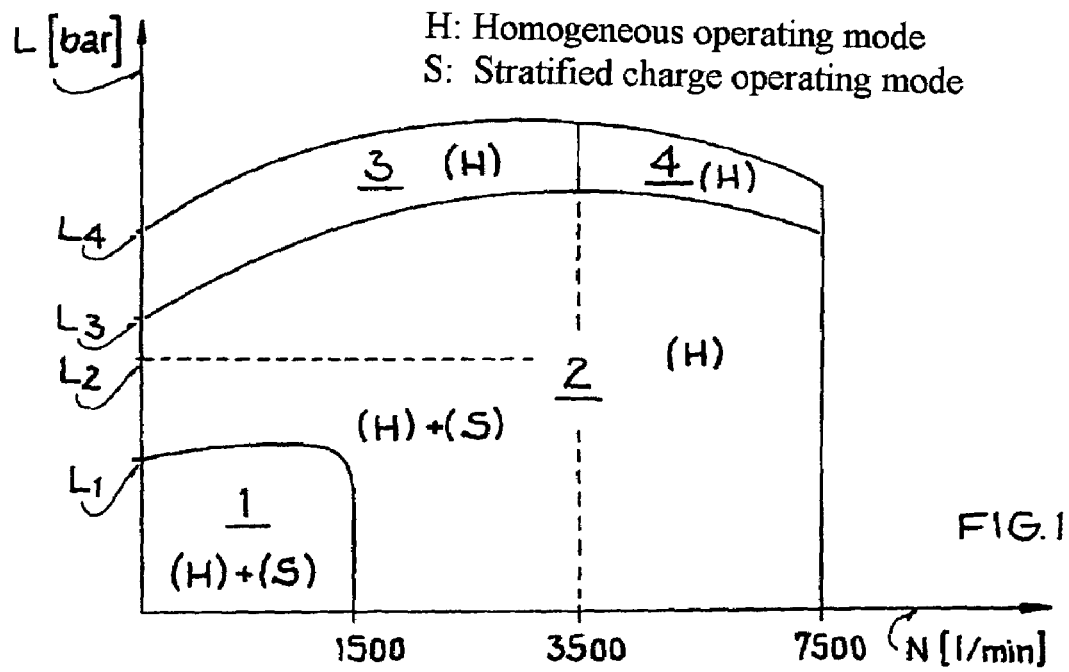
FIG. 1 is a schematic characteristic field diagram of a direct-injecting internal combustion engine.

According to FIG. 1, the multiple injection is varied as a function of the load in such a way that in some load ranges a dual or triple injection takes place, with a single fuel injection being able to take place as a function of the load. In the characteristic field diagram according to FIG. 1, a single fuel injection takes place in the load range 1 since in this range the engine is operating with a very low load L at a low rotational speed N. In the load range 2, a triple fuel injection is preferably performed, with a single or dual fuel injection being able to take place at a number of load points. In the load region 3, a single, dual or a triple fuel injection is preferably performed, with a single or a dual fuel injection taking place in the load range 4. Depending on the number of injections performed and the injection times of the individual part amounts, a homogeneous operating mode H or a stratified charge operating mode S takes place. For example, a homogeneous operating mode H or a stratified charge operating mode S can take place in the load range 1 with a rotational speed up to 1500 and a load $L_1$ with an effective average pressure up to one bar. A homogeneous operating mode H or a stratified charge operating mode S can also take place up to a load $L_2$ with an effective average pressure between seven and eight bar. Further examples are shown in FIG. 1, with the load $L_3$ corresponding to an effective average pressure of approximately eight to nine bar, and the load $L_4$ corresponding to an effective pressure of 13 bar in internal combustion engines without supercharging and to an effective average pressure of approximately 21 bar in internal combustion engines with supercharging.

In the stratified charge operating mode, what is referred to as a jet-controlled combustion method takes place. The injection of the fuel is carried out in the stratified charge operating mode in the compression stroke in a crank angle range between 90° and 10° before the ignition top dead center ZOT. In this context, the fuel injection takes place in three part amounts during one working cycle. In this context, the first part amount can alternatively be performed in the intake stroke, preferably between 200° and 300° crank angle before a top dead center, in particular at high loads with an effective average pressure between four and eight bar.

Figure 2:
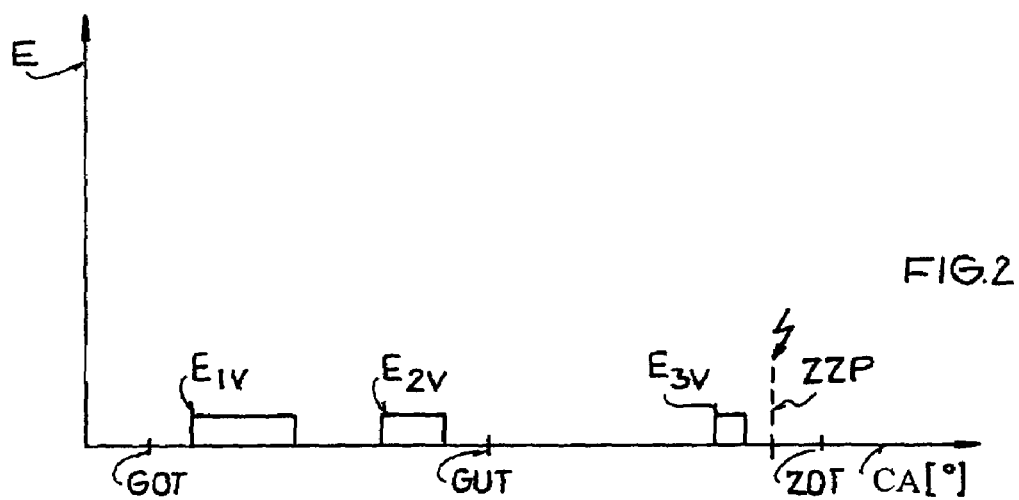
FIG. 2 is a schematic diagram of the injection profile of the internal combustion engine from FIG. 1 in a homogeneous operating mode with triple injection plotted against the crank angle.

FIG. 2 illustrates the time profile of the fuel injections in the homogeneous operating mode of the internal combustion engine with triple injection, with the triple injection shown being well suited, for example, both for the upper load region and for the full load region. Alternatively, such triple injection can also be applied at other load points, for example when the internal combustion engine is started.

The first fuel injection $E_{1V}$ takes place in the intake stroke of the internal combustion engine, i.e. between GOT and GUT, preferably in a crank angle range between 300° and 200° crank angle before the ignition top dead center ZOT. The injection of the second part amount $E_{2V}$ is started in particular after a period of 10° to 100° crank angle after the end of injection of the first fuel part amount $E_{1V}$. The amount of the second injection $E_{2V}$ can be varied as a function of the load, and in certain circumstances may be less than 1% of the entire fuel injection amount. It is conceivable to perform the second part amount $E_{2V}$ in an initial part of the compression stroke, in particular to approximately 80° crank angle before the ignition top dead center ZOT.

In the compression stroke of the internal combustion engine, a third amount of fuel $E_{3V}$, which can be approximately 5% to 50% of the entire amount of fuel, is injected. The amounts of fuel which are injected in the intake stroke of the internal combustion engine are homogenized up to the injection time of the third fuel amount $E_{3V}$ so that a well-conditioned mixture is available in the entire combustion chamber range. An ignitable mixture cloud is then placed in the vicinity of the spark plug by the third fuel injection, which causes a reliable ignition of the entire mixture present in the combustion chamber to take place. Just after the end of injection of the third fuel part amount $E_{3V}$ the ignition of the mixture takes place. For optimum ignition of the mixture cloud, the injection time ZZP is varied as a function of the load so that misfires are prevented in all the load ranges, with the distance between the ignition time ZZP and the end of the third fuel part amount $E_{3V}$ being not more than 100° crank angle.

Figure 3:
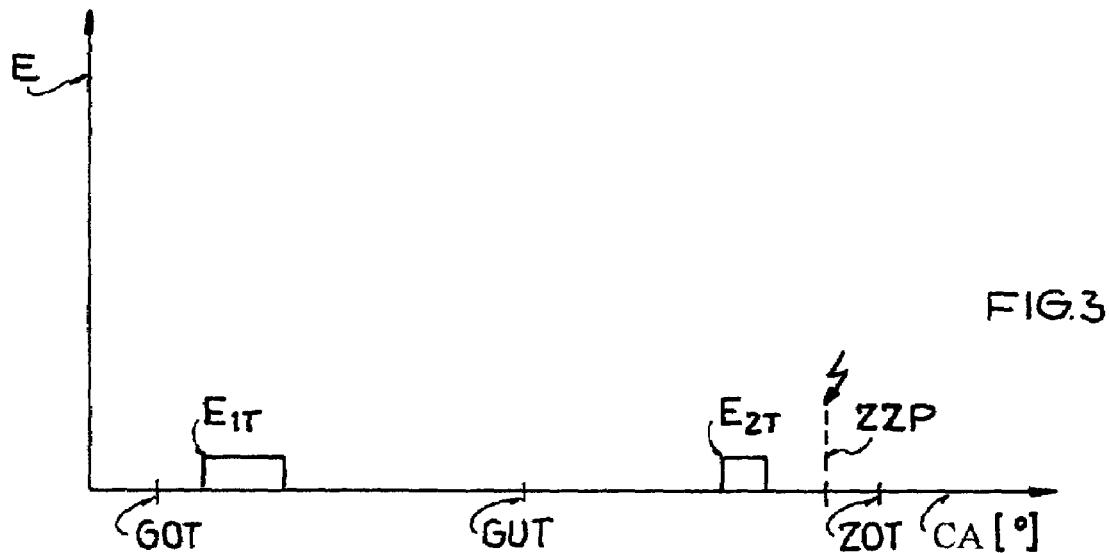
FIG. 3 is a schematic diagram of the injection profile of the internal combustion engine from FIG. 1 in the homogeneous operating mode with dual injection plotted against the crank angle.

In the homogeneous operating mode of the internal combustion engine it is also conceivable to omit the second fuel injection so that a second fuel injection takes place according to FIG. 3. A dual injection in the homogeneous operating mode of the internal combustion engine is preferably performed in the partial load range. In this context, the first fuel part amount $E_{1T}$ takes place in the intake stroke. The second fuel part amount $E_{2T}$ is then performed in the compression stroke just before the ignition time ZZP.

Figure 4:
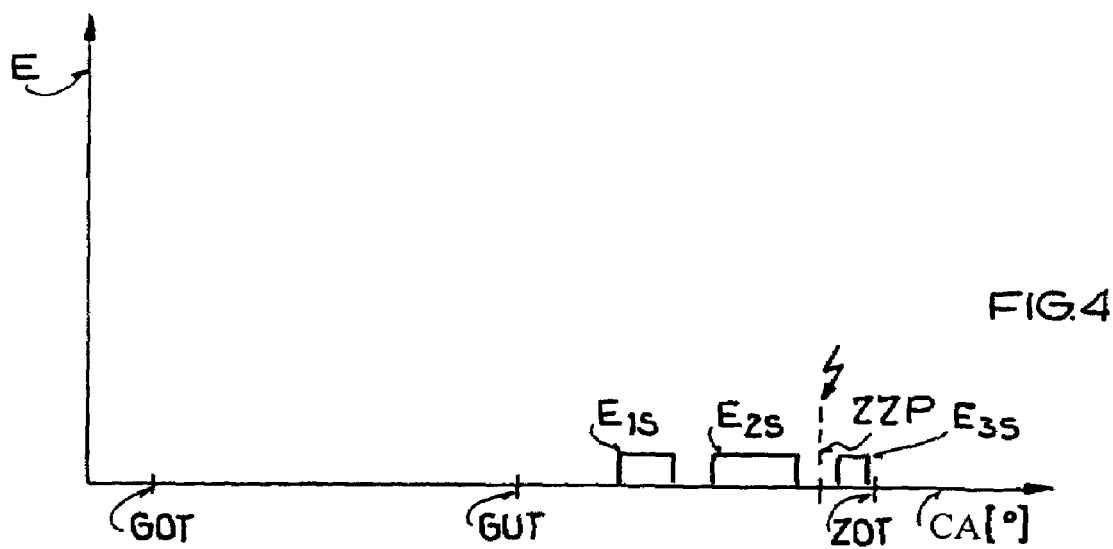
FIG. 4 is a schematic diagram of the injection profile of the internal combustion engine from FIG. 1 in the stratified charge operating mode plotted against the crank angle.

The time profile of the fuel injections E in the stratified charge operating mode is illustrated in FIG. 4, with the fuel injections being configured in such a way that first, second and third part amounts $E_{1S}$, $E_{2S}$, and $E_{3S}$ are introduced in the compression stroke of the internal combustion engine. The first part amount $E_{1S}$ can alternatively be performed at high loads, in particular with an effective average pressure $P_{me}$ between 4 and 8 bar, preferably in the intake stroke between 200° and 300° crank angle before ZOT. In the stratified charge operating mode of the internal combustion engine the ignition takes place between the second fuel injection $E_{2S}$ and the third fuel injection $E_{3S}$. The injection of the second part amount $E_{2S}$ is ended as a function of the load in a crank angle range which lies between 15° crank angle CA before the ignition time ZZP and 4° crank angle CA after the ignition time ZZP. That is to say the ignition of the fuel/air mixture which is formed is performed in a number of load point ranges during the injection of the second part amount. The third injection $E_{3S}$ advantageously takes place just after the end of the second injection $E_{3S}$ so that reliable ignition of the third part amount $E_{3S}$ is ensured.

In this exemplary embodiment, a jet-controlled combustion method is carried out, in which an injection nozzle which opens toward the outside is preferably used. The injection strategy described above serves in particular to stabilize the jet-controlled combustion method in the stratified charge operating mode and permits a larger amount of exhaust gas recirculation in the stratified charge operating mode. This reduces the NOx formation.

In the jet-controlled combustion method, a fuel hollow cone with an angle between 70° and 100° is introduced into the combustion chamber by means of the injection nozzle so that the fuel hollow cone impinges on combustion air which is compressed in the combustion chamber in the stratified charge operating mode. A toroidal eddy is thus formed in the outer region or at the edge of the injected fuel hollow cone, as a result of which an ignitable fuel/air mixture is made available in the vicinity of the electrodes of the spark plug. The spark plug is arranged in such a way here that the electrodes of the spark plug project into the edge eddy which is obtained without them being significantly wetted during the fuel injection, i.e. when there is light or slight wetting of the electrodes at the spark plug the majority of the fuel should be vaporized again at the electrodes by the ignition time.

The third fuel part amount $E_{3S}$ causes the incipient combustion to be stabilized.

With the multiple injection described, the operating behavior of the internal combustion engine can be improved both in the homogeneous mode and in the stratified charge operating mode. The consumption and formation of emissions can thus be optimized. These advantages are obtained in particular when a piezo-injector is used in which short injection times, for example less than 0.25 msec, can easily be achieved. As a result, very small fuel amounts can be introduced into the combustion chamber in a part amount if the fuel injection takes place with high injection pressures between 150 and 200 bar or between 150 and 300 bar. As a result, multiple injections are made possible during a working cycle both in the full load range and also when a spark-ignition internal combustion engine with direct injection starts.

In all the method examples the fuel is preferably injected into the combustion chamber in the stratified charge operating mode with a combustion chamber counter-pressure of approximately 16 bar. It is also advantageous for the injection pressure of the fuel to be varied between 100 bar and 300 bar, in particular between 150 bar and 250 bar, with the jet of fuel which emerges from the injection nozzle being injected into the combustion chamber in the form of a hollow cone with a jet angle between 70° and 100°.

The invention relates to two methods for forming a fuel/air mixture of a directly injecting fuel combustion engine with spark ignition. In the first method, the fuel injection is configured in a homogeneous operating mode of the internal combustion engine in such a way that a first and a second part amount are introduced in the intake stroke, and a third part amount is introduced in the compression stroke, wherein the ignition of the fuel/air mixture which is formed takes place after the end of injection of the third part amount. According to the second method, the injection of fuel is configured in a stratified charge operating mode of the internal combustion engine in such a way that a first, a second and a third part amount are introduced into the combustion chamber during the compression stroke of the internal combustion engine, wherein the injection of the second part amount is ended at a crank angle which lies in a range between 15° CA before to 4° CA after ZZP.

The two methods described are suitable for use in directly injecting internal combustion engines with spark ignition in which the jet-controlled combustion method takes place. With such a combustion method it is necessary for a satisfactorily conditioned mixture to be available in the vicinity of the spark plug within a very short time. The position and properties of the ignitable mixture cloud are influenced positively, as a result of which an optimum mixture cloud is brought about in all the load ranges. This leads to reliable ignition of the mixture which is formed while at the same time retaining an optimized efficiency level during the entire operation of the engine. As a result, the undesired misfires can be minimized. In particular, when the internal combustion engine starts, the fuel quantity can be reduced, which leads to a reduction in the emissions at the start so that strict exhaust gas standards can be met. Furthermore, the torque of the internal combustion engine in the full-load range can be increased by means of multiple injection or triple injection.

Furthermore, the level of toleration of exhaust gas recirculation (EGR) can be expanded both in the homogeneous operating mode and in the stratified charge operating mode, i.e. larger amounts of exhaust gas can be recirculated into the combustion chamber during one working cycle in order to take part in the combustion. In particular, as a result of the triple injection in the stratified charge operating mode of the internal combustion engine, the method of the invention permits what is referred to as the jet-controlled combustion method to be stabilized, as a result of which a higher level of tolerance of EGR is achieved. This leads to a further reduction in the NOx emissions and the particle emissions. The stratified charge operating mode can more easily be extended to all the rotational speed ranges and load ranges.

The range of functions achieved with the methods described above is intended to make it possible to carry out a single, dual or triple injection in a spark-ignition internal combustion engine with direct injection as a function of the load point at which the engine is operating. At the same time, the control criteria in a control device which is provided for controlling the injection times and ignition times are maintained.

The invention claimed is:

1. A method for forming and igniting an ignitable fuel/air mixture in a combustion chamber of a spark-ignition internal combustion engine with direct injection, comprising:
   feeding combustion air to the combustion chamber via at least one inlet duct,
   injecting fuel into the combustion chamber by way of a fuel injector arranged in the combustion chamber such that, in a homogeneous internal combustion engine operating mode, first and second partial fuel amounts are introduced in an intake stroke and a third partial fuel amount is introduced in a compression stroke, and
   igniting a fuel/air mixture formed by way of at least one spark plug arranged in the combustion chamber at a distance of at most 100° CA after injection of the third partial fuel amount terminates, thereby avoiding application of said fuel to a combustion chamber wall.

2. The method as claimed in claim 1, further comprising varying an injection period of the third partial fuel amount as a function of load in such a way that the third partial fuel amount is approximately 5% to 50% of the entire amount of fuel.

3. The method as claimed in claim 1, wherein the injection of the first partial fuel amount is started in the intake stroke between 300° CA and 200° CA before the top dead center.

4. The method as claimed in claim 1, wherein a period between the end of injection of the first partial fuel amount and the start of injection of the second partial fuel amount is approximately 10° CA to 60° CA.

5. The method as claimed in claim 1, further comprising varying the second partial fuel amount as a function of load, and wherein, under certain circumstances, said second partial fuel amount is less than 1% of the entire fuel injection amount.

6. The method as claimed in claim 1, wherein a fuel injection nozzle is embodied as an injection nozzle which opens to the outside so that fuel from the fuel injection nozzle is injected in the form of a hollow cone.

7. The method as claimed in claim 6, wherein a toroidal fuel/air mixture eddy is formed at the end of the hollow cone in such a way that electrodes of a spark plug arranged outside a generated surface of the hollow cone are in contact with the toroidal fuel/air mixture eddy.

8. The method as claimed in claim 6, wherein a control device of the fuel injection nozzle is driven piezoelectrically.

* * * * *